United States Patent
Lin et al.

(10) Patent No.: US 8,568,670 B2
(45) Date of Patent: Oct. 29, 2013

(54) PROCESS FOR PRODUCING BASIC LEAD CARBONATE

(75) Inventors: Guorong Lin, Jiangxi (CN); Huanrong Yu, Jiangxi (CN); Jihong Li, Jiangxi (CN)

(73) Assignee: Jiangxi Rare Earth and Rare Metals Tungsten Group Holding Co., Ltd., Jiangxi (CN)

( * ) Notice: Subject to any disclaimer, the term of this patent is extended or adjusted under 35 U.S.C. 154(b) by 0 days.

(21) Appl. No.: 13/514,626

(22) PCT Filed: Dec. 30, 2009

(86) PCT No.: PCT/CN2009/076289
§ 371 (c)(1),
(2), (4) Date: Jun. 18, 2012

(87) PCT Pub. No.: WO2011/069311
PCT Pub. Date: Jun. 16, 2011

(65) Prior Publication Data
US 2013/0043139 A1    Feb. 21, 2013

(30) Foreign Application Priority Data
Dec. 8, 2009 (CN) .......................... 2009 1 0241419

(51) Int. Cl.
*C22B 13/00* (2006.01)

(52) U.S. Cl.
USPC .................. 423/43; 423/92; 423/98; 423/434

(58) Field of Classification Search
USPC .......................... 423/43, 92, 98, 434; 106/432
See application file for complete search history.

(56) References Cited

U.S. PATENT DOCUMENTS

| | | | | |
|---|---|---|---|---|
| 2,109,755 A | * | 3/1938 | Sessions | 423/93 |
| 3,459,573 A | * | 8/1969 | Morita et al. | 106/415 |
| 3,511,599 A | * | 5/1970 | Suriani | 210/711 |
| 4,153,451 A | * | 5/1979 | Crasto et al. | 75/432 |

FOREIGN PATENT DOCUMENTS

| | | |
|---|---|---|
| CN | 1920065 A | 2/2007 |
| GB | 311986 | 5/1929 |
| GB | 426778 | 4/1935 |

* cited by examiner

*Primary Examiner* — Steven Bos
(74) *Attorney, Agent, or Firm* — Hammer & Associates, P.C.

(57) ABSTRACT

A process for producing basic lead carbonate is provided. The process comprises: (1) immersing neutralization slag to obtain sodium hydroxide solution; (2) leaching lead chloride slag with the aqueous solution containing sodium chloride and hydrochloric acid, adding sodium sulfide and filtering; (3) neutralizing the filtrate with sodium hydroxide solution, filtering and washing the precipitate; and (4) converting the precipitate to basic lead carbonate with ammonium bicarbonate, crystallizing and washing. Said neutralization slag and lead chloride slag are the redundant slag from fire refining bismuth. Said process makes better use of the redundant slag from fire refining bismuth, saves resources and reduces environmental pollution.

2 Claims, 3 Drawing Sheets

PROCESS FOR PRODUCING BASIC LEAD CARBONATE

TECHNICAL FIELD

The present invention relates to a process of non-ferrous metal recovery, especially a process for producing basic lead carbonate.

The term "yellow lead" is commonly referred to as lead oxide of formula PbO;

The term "low impurity basic lead carbonate" is basic lead carbonate with impurity elements being controlled as (mass fraction): Bi: <0.3%; Cu: <0.05%; Ag: <0.008%; Zn: <0.5%; and Cl: <1%;

The term "economical ammonium bicarbonate" means that a relatively cheap ammonium bicarbonate is used in place of the commonly used ammonium carbonate during the transformation of basic lead chloride into basic lead carbonate in the present invention;

The term "neutralization slag" is a smelting slag produced during the neutralization of the crude bismuth that has been chlorinated, it is composed of sodium hydroxide, sodium chloride, and bismuth metal, etc.;

The term "lead chloride slag" is a smelting slag produced during the removal of lead by chlorinating crude bismuth with chlorine, it is composed of lead chloride, and bismuth metal, etc.;

The term "refined bismuth" is a bismuth product of No. Bi9999 in accordance with GB/T 915-1984;

The term "crude bismuth" is a crude metal produced by reduction of the later slag from the treatment of the lead anode slime inside a silver-smelting furnace;

The term "lean lead" means that lead ions are below a minimum value of 50 g/L that is required for maintenance of normal electrolysis in a circulating system of lead-bismuth alloy electrolysis;

The term "redundant slag" is a collection of lead chloride slag and neutralization slag produced in a large amount during refining of the crude bismuth, which is inexpensive and unmanageable; and The term "supernatant liquor" is the supernatant sodium hydroxide solution after the immersion and clarification of the neutralization slags.

PRIOR ART

At present, waste lead slags are produced during the development and production of many mineral resources, which will cause resource-wasting and economic losses as well as significant environmental pollution if not reasonably utilized.

In a process of bismuth smelting, a large amount of lead-containing waste slags is leached out. The slags contain valuable metals such as lead, copper, silver and bismuth, and the lead content is generally from 60% to 70% (mass fraction). Therefore, the use of waste lead slags for producing lead-salt series of chemical products such as basic lead carbonate, tribasic lead sulfate and lead sulfate has attracted great attention.

SUMMARY OF THE INVENTION

The object of this invention is to provide a process for producing basic lead carbonate with low impurity content.

The process according to the present invention uses "redundant slags" from fire refining of bismuth to produce basic lead carbonate with low impurity content. The process comprises the following steps: (1) immersing neutralization slags to obtain sodium hydroxide solution; (2) leaching lead chloride slags and filtering; (3) alkali neutralizing, filtering and washing, and (4) carbonate converting, crystallizing, filtering and washing.

In the step of immersing neutralization slags to obtain sodium hydroxide solution, crushed neutralization slags are stirred in an immersing pool, immersed for 1-2 h and clarified. The supernatant liquor is a sodium hydroxide solution which can be used directly. Preferably, the crushed neutralization slags are immersed with addition of clean water in the immersing pool for 1.5 h.

In the step of leaching lead chloride slags and filtering, the crushed lead chloride slags are charged into a reaction tank containing an aqueous solution of sodium chloride with a concentration of 300-400 Kg/m$^3$, stirred for 1-1.5 h and heated to 85-95° C., adjusted to a pH value of 1-4 with hydrochloric acid; reacted for 1-1.5 h, followed by addition of a sulfide salt, such as $Na_2S$, $K_2S$ and $(NH_4)_2S$. Purification measures are employed, such as filtration and clarification. The amount of sulfide salt added in this step is 1-2 times of the theoretical value of sodium sulfide required for precipitating copper ions in the solution. Copper is removed by 0.5 h of sulfidation. The final pH value for leaching lead chloride is controlled at 3.5-5.5, and filtration is carried out at a temperature of 70-95° C. Preferably, the crushed lead chloride slags are added to an aqueous solution of sodium chloride with a concentration of 380 Kg/m$^3$, adjusted to pH 2 with hydrochloric acid, heated to 90° C. and stirred for 1.5 h. Preferably, the amount of sulfide salt added is 1.2 times of the theoretical value of sodium sulfide required for precipitating copper ions in the solution. Preferably, the final pH for leaching lead chloride is 4, and the temperature therefor is 90° C. The main reactions are as follows:

$$PbCl_2 + 2NaCl = Na_2[PbCl_4] \quad (1)$$

$$Cu^{2+} + S^{2-} = CuS\downarrow \quad (2)$$

$$BiCl_3 + 3H_2O = Bi(OH)_3\downarrow + 3HCl \quad (3)$$

$$2Ag^+ + S^{2-} = Ag_2S\downarrow \quad (4)$$

In the step of alkali neutralizing, filtering and washing, the filtrate obtained in step (2) is back heated to 70-95° C. while stirring, such that the precipitated crystals are dissolved, then the sodium hydroxide solution prepared in step (1) is added slowly until the pH of the solution is 6-8 which means completion of the neutralization, clarified, then filtered through a multi-layer filter cloth, and washed 3-6 times. Preferably, the filtrate obtained is back heated to 85° C. while stirring. Preferably, the sodium hydroxide solution prepared in step (1) is added slowly until the pH of the solution is 7. Preferably, after neutralization is completed, clarification is carried out, followed by filtrating through a multi-layer filter cloth and washing up to four times. The main reactions are as follows:

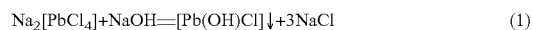
$$Na_2[PbCl_4] + NaOH = [Pb(OH)Cl]\downarrow + 3NaCl \quad (1)$$

$$NaOH + HCl = NaCl + H_2O \quad (2)$$

In the step of carbonate convering, crystallizing, filtering and washing, the filter slags (filter residue) obtained in step (3) are charged into a reaction tank containing clean water and stirred. The amount of ammonium bicarbonate added is 2-3 times of the theoretical value of ammonium bicarbonate required by the filter slags. At the same time, a small amount of sodium hydroxide solution obtained in step (1) is used to adjust pH which is to be 8-11, and procedures of stirring for 1-2 h, crystallizing & precipitating, filtering, and washing up to 3-6 times are performed. Preferably, an economical carbonate, i.e. ammonium bicarbonate, is used for carbonate conversion in this step. Preferably, the amount of ammonium bicarbonate added is 2.7 times of the theoretical value of ammonium bicarbonate required by the filter slags. Preferably, a small amount of sodium hydroxide solution obtained in step (1) is used to adjust pH which is to be 9, and procedures of stirring for 1.5 h, crystallizing & precipitating, filtering, and washing for 5 times are performed. The main reactions are as follows:

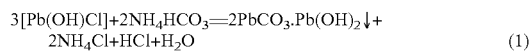

$$3[Pb(OH)Cl]+2NH_4HCO_3=2PbCO_3.Pb(OH)_2\downarrow+ 2NH_4Cl+HCl+H_2O \quad (1)$$

$$NaOH+HCl=NaCl+H_2O \quad (2)$$

The basic lead carbonate product, as a substitute for yellow lead, can be added directly to a circulating electrolyte of lead-bismuth alloy electrolysis without drying, thus the problem of "lean lead" can be solved, and the process can be optimized. The basic lead carbonate with low impurity content can also be calcined at high temperature to produce yellow lead, and the yellow lead produced can meet the national first class standard.

The process of the present invention uses "redundant slags" from fire refining of bismuth as raw material, the leaching of lead chloride slags and the enriching of impurities such as copper and bismuth are carried out simultaneously. The leached slags containing impurities such as copper and bismuth are returned directly to fire smelting; the mother liquor of alkali neutralization is mainly a sodium chloride solution close to saturation which is to be returned to the step of leaching lead chloride slags. The smelting process of "blast furnace smelting, then lead-bismuth alloy electrolysis, then fire refining" is optimized in the present invention, such that bismuth smelting slags are better processed and utilized, so as to save resource. In the process of the present invention, the circulation of lead is performed in a closed system, so as to reduce environmental pollution.

A process for producing basic lead carbonate comprising the following steps: (1) immersing slag to obtain sodium hydroxide solution; (2) leaching lead chloride slag and filtering; (3) alkali neutralizing, filtering and washing; and (4) carbonate converting, crystallizing, filtering and washing. The process of the present invention uses "redundant slag" from fire refining of bismuth as raw materials. The conventional smelting process of "blast furnace smelting, then lead-bismuth alloy electrolysis, and then fire refining" is improved, such that bismuth smelting slag are better processed and utilized, so as to save resource. In the process of the present invention, the circulation of lead is performed in a closed system, which reduces environmental pollution.

BRIEF DESCRIPTION OF ACCOMPANYING DRAWINGS

EMBODIMENTS FOR CARRYING OUT THE PRESENT INVENTION

Example 1

Figure 1:
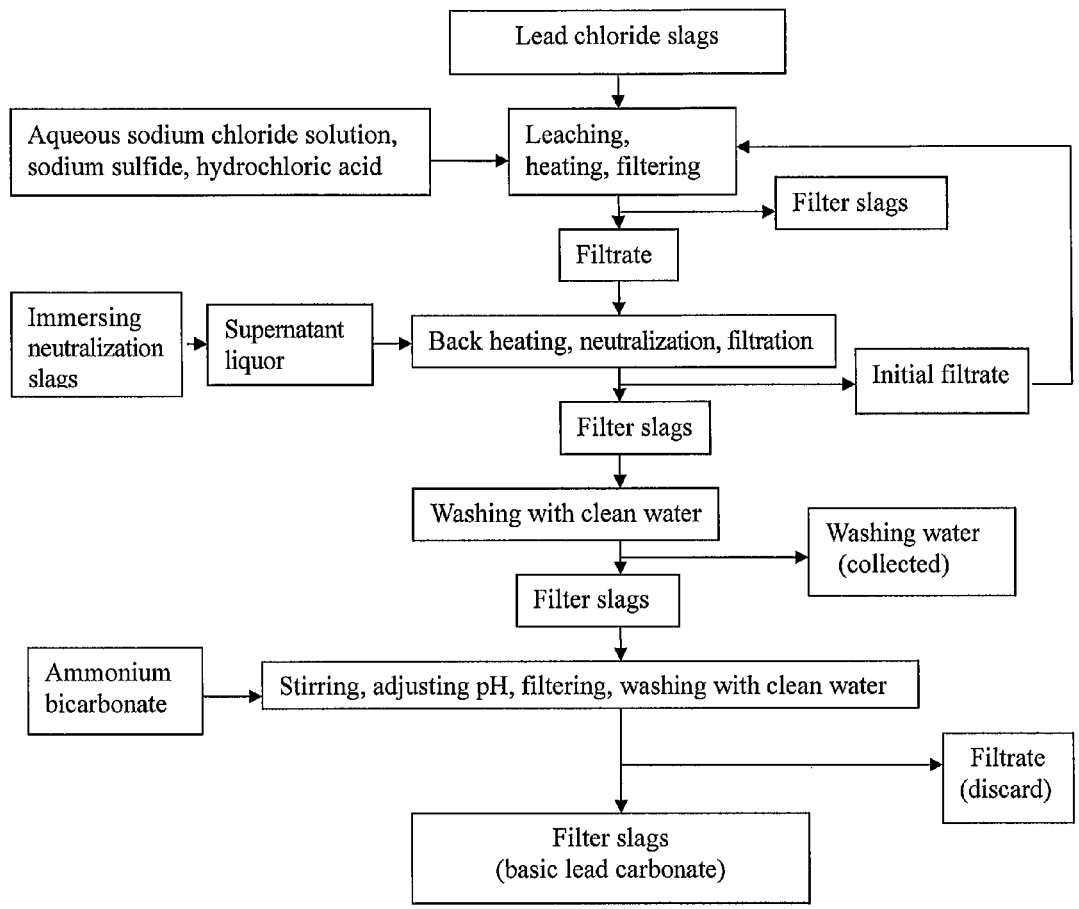
FIG. 1 is a flow diagram of the process for producing basic lead carbonate according to the present invention.
Figure 2:
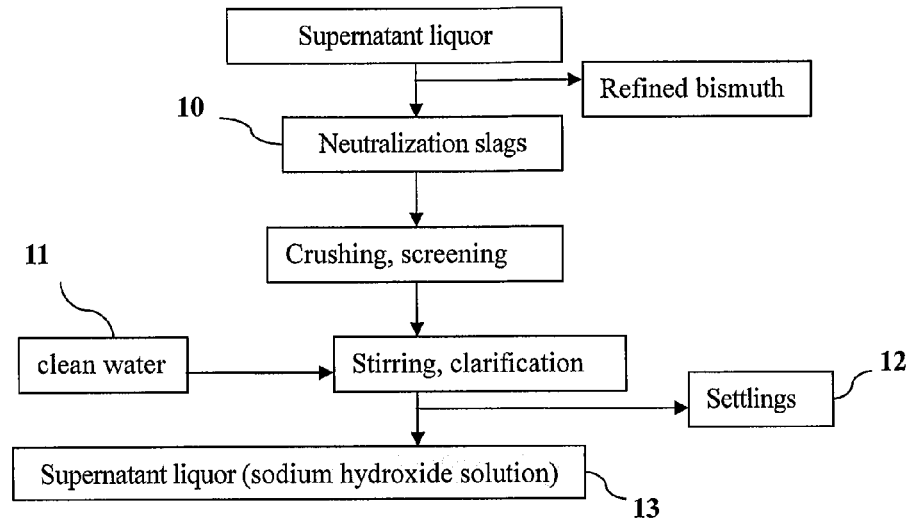
FIG. 2 is a flow diagram of the process of immersing neutralization slags to obtain sodium hydroxide solution according to the process of the present invention for producing basic lead carbonate.

As shown in FIG. 1, a flow diagram is illustrated, wherein the "redundant slags" in fire refining of bismuth, i.e., lead chloride slags ($PbCl_2$) and neutralization slags (NaOH) are used as raw materials to produce basic lead carbonate with low impurity content. The main steps of the process include:

(1) Immersing Neutralization Slags to Obtain Sodium Hydroxide Solution:

As shown in FIG. 2, neutralization slags 10 are crushed, then added into an immersing pool containing clean water 11 with stirrer in operation, immersed for 1-2 h and clarified. The supernatant liquor (sodium hydroxide solution) 13 is stored for use. The settlings 12 are dried and then returned directly to refining pot for smelting.

Figure 3:
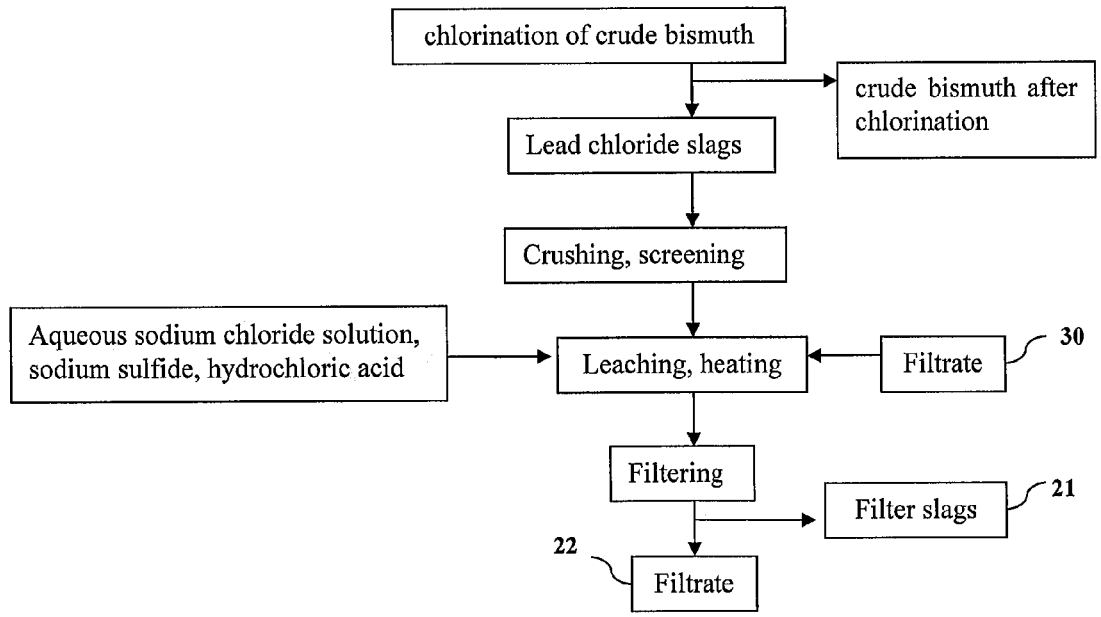
FIG. 3 is a flow diagram of the process of leaching lead chloride slags and filtering according to the process of the present invention for producing basic lead carbonate.

(2) Leaching Lead Chloride Slags and Filtering:

As shown in FIG. 3, the filtrate 30 and lead chloride slags which are crushed to about 200 mesh are fed into a reaction tank. The concentration of sodium chloride in the solution contained in the reaction tank is adjusted to 300-400 $Kg/m^3$ with sodium chloride. The solution is adjusted to have an initial pH value 1-4 with hydrochloric acid, heated to 85-95° C. and stirred for 1-1.5 h. The amount of sulfide salts (e.g. $Na_2S$, $K_2S$, $(NH_4)_2S$, etc.) added in this step is determined by impurity content such as copper in the raw materials, being 1-2 times of the theoretical value of sodium sulfide required for precipitating copper ions in the solution. Copper is removed by 0.5 h of sulfidation. The final pH value for leaching is controlled at 3.5-5.5, and filtration is carried out at a temperature of 70-95° C. The filter slags 21 can be returned as bismuth concentrates to material mixing, and the filtrate 22 is transferred to the next step.

Figure 4:
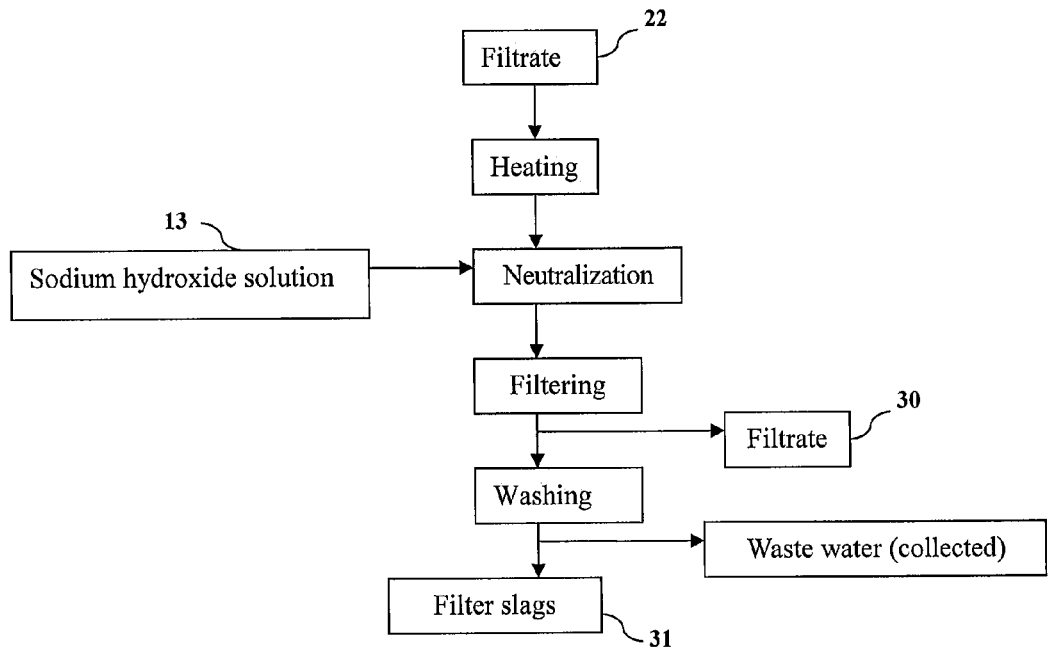
FIG. 4 is a flow diagram of the process of alkali neutralizing, filtering and washing in the process of the present invention for producing basic lead carbonate.

(3) Alkali Neutralizing, Filtering and Washing:

As shown in FIG. 4, the filtrate 22 is back heated to 70-95° C. while being stirred, such that the precipitated crystals are dissolved, then the sodium hydroxide solution 13 obtained in step (1) is added slowly until the pH of the solution is 6-8 which means completion of the neutralization, then washing is repeated for 3-6 times. The filter slags 31 are transferred to the next step.

Figure 5:
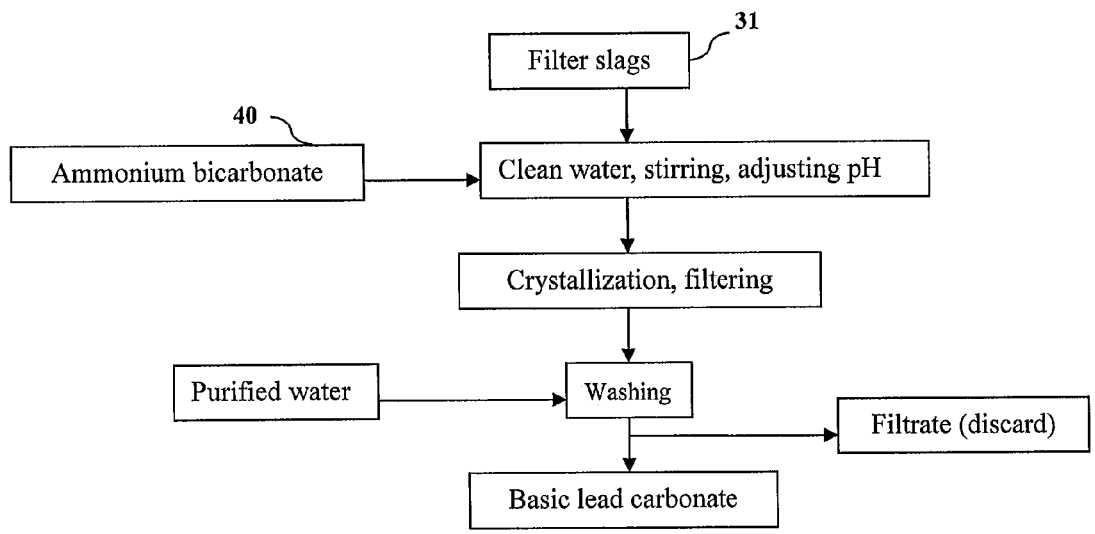
FIG. 5 is a flow diagram of the process of carbonate converting, crystallizing, filtering and washing in the process of the present invention for producing basic lead carbonate.

(4) Carbonate Converting, Crystallizing, Filtering and Washing:

As shown in FIG. 5, the filter slags 31 are charged into a reaction tank containing clean water and stirred. The amount of ammonium bicarbonate 40 added is 2-3 times of the theoretical value of ammonium bicarbonate required by the filter slags 31. At the same time, a small amount of sodium hydroxide solution 13 obtained in step (1) is used to adjust pH which is to be 8-11, and procedures of stirring for 1-2 h, crystallizing & precipitating, filtering, and washing for 3-6 times are performed.

As a substitute for yellow lead, the basic lead carbonate product can be added directly to a circulating electrolyte of lead-bismuth alloy electrolysis without drying, thus solving the problem of "lean lead".

Example 2

As shown in FIG. 1, a flow diagram is illustrated, wherein the "redundant slags" in fire refining of bismuth, i.e., lead chloride slags (PbCl$_2$) and neutralization slags (NaOH) are used as raw materials to produce basic lead carbonate with low impurity content. The main steps of the process include:

(1) Immersing Neutralization Slags to Obtain Sodium Hydroxide Solution:

As shown in FIG. 2, neutralization slags 10 are crushed, then added into an immersing pool containing clean water 11 with stirrer in operation, immersed for 1.5 h and clarified. The supernatant liquor (sodium hydroxide solution) 13 is stored for use. The settlings 12 are dried and then returned directly to refining pot for smelting.

(2) Leaching Lead Chloride Slags and Filtering:

As shown in FIG. 3, the filtrate 30 and lead chloride slags which are crushed to about 200 meshes are fed into a reaction tank. The concentration of sodium chloride in the solution contained in the reaction tank is adjusted to 380 Kg/m$^3$ with sodium chloride. Initial solution is adjusted to pH 2.0 with hydrochloric acid, heated to 90° C. and stirred for 1.5 h. The amount of sulfide salts added in this step is 1.2 times of the theoretical value of sodium sulfide required for precipitating copper ions in the solution. Copper is removed after 0.5 h of sulfidation. The final pH for leaching is controlled at 4, and filtration is carried out at a temperature of 90° C. The filter slags 21 can be returned as bismuth concentrates to material mixing, and the filtrate 22 is transferred to the next step.

(3) Alkali Neutralizing, Filtering and Washing:

As shown in FIG. 4, the filtrate 22 is back heated to 85° C. with stirring, such that the precipitated crystals are dissolved, then the sodium hydroxide solution 13 obtained in step (1) is added slowly until the pH of the solution is 7 which means completion of the neutralization, then the filtrate 22 is washed for 4 times. The filter slags 31 are transferred to the next step.

(4) Carbonate Converting, Crystallizing, Filtering and Washing:

As shown in FIG. 5, the filter slags 31 are charged into a reaction tank containing clean water and stirred. The amount of ammonium bicarbonate 40 added is 2.7 times of the theoretical value of ammonium bicarbonate required by the filter slags 31. At the same time, a small amount of sodium hydroxide solution 13 obtained in step (1) is used to adjust pH which is to be 9, and procedures of stirring for 1.5 h, crystallizing & precipitating, filtering, and washing for 5 times are performed.

The basic lead carbonate product, as a substitute for yellow lead, can be added directly to a circulating electrolyte of lead-bismuth alloy electrolysis without drying, thus the problem of "lean lead" can be solved, and the process can be optimized.

The invention claimed is:

1. A process for producing basic lead carbonate from redundant slag obtained from refining crude bismuth and neutralizing slag, the process comprising the following steps of:
    (1) immersing the neutralizing slag in water to obtain sodium hydroxide solution as a supernatant liquor;
    (2) leaching the redundant slag in an aqueous solution of sodium chloride having a concentration of 300-400 Kg/m$^3$, a pH of 1-4, at 85-95° C. with stirring for 1-1.5 h, and adding a sulfide salt to the solution of sodium chloride and redundant slag in an amount sufficient to precipitate copper ions therefrom and thereby forming a leached lead chloride solution, and controlling a final pH of the leached lead chloride solution to 3.5-5.5; and then filtering the lead chloride solution to obtain a final lead chloride;
    (3) alkali neutralizing, filtering and washing the final lead chloride by washing, 3-6 times, with the supernatant liquor to form a filter slag; and
    (4) carbonate converting the filter slag by charging into clean water containing an amount of ammonium bicarbonate 2-3 times of a theoretical amount of ammonium bicarbonate required by the filter slag, and using sufficient supernatant liquor to adjust pH to 8-11 and stirring for 1-2 h to obtain a basic lead carbonate, and then crystallizing and precipitating, filtering, and washing the basic lead carbonate.

2. A process for lead-bismuth alloy electrolysis where the basic lead carbonate produced according to claim 1 is added directly to a circulating electrolyte of lead-bismuth alloy electrolysis without drying.

\* \* \* \* \*